United States Patent
Go et al.

(10) Patent No.: US 11,123,703 B2
(45) Date of Patent: Sep. 21, 2021

(54) FINE PARTICLE MANUFACTURING DEVICE

(71) Applicant: enParticle Co., Ltd., Busan (KR)

(72) Inventors: Jeung Sang Go, Busan (KR); Hyo Chang Cho, Busan (KR); Hyeong Jin Jeon, Busan (KR); Moon Jeong Kim, Busan (KR)

(73) Assignee: ENPARTICLE CO.,LTD., Busan (KR)

( * ) Notice: Subject to any disclaimer, the term of this patent is extended or adjusted under 35 U.S.C. 154(b) by 503 days.

(21) Appl. No.: 16/087,575

(22) PCT Filed: Mar. 22, 2017

(86) PCT No.: PCT/KR2017/003050
§ 371 (c)(1),
(2) Date: Sep. 21, 2018

(87) PCT Pub. No.: WO2017/164636
PCT Pub. Date: Sep. 28, 2017

(65) Prior Publication Data
US 2019/0099729 A1    Apr. 4, 2019

(30) Foreign Application Priority Data
Mar. 22, 2016  (KR) .................... 10-2016-0033996

(51) Int. Cl.
*B01J 2/00*      (2006.01)
*B01J 2/02*      (2006.01)
(Continued)

(52) U.S. Cl.
CPC ............. *B01J 8/008* (2013.01); *B01F 3/0865* (2013.01); *B01F 5/0256* (2013.01);
(Continued)

(58) Field of Classification Search
CPC .. B01F 3/00; B01F 3/08; B01F 3/0861; B01F 3/0865; B01F 5/00; B01F 5/02;
(Continued)

(56) References Cited

U.S. PATENT DOCUMENTS

| 6,576,023 B2 | 6/2003 | Nakajima et al. |
| 7,553,434 B2* | 6/2009 | Kawai ................. B01D 11/04 264/14 |
| 7,837,379 B2* | 11/2010 | Fiering ............... B01F 13/0059 366/181.5 |

FOREIGN PATENT DOCUMENTS

| JP | H09-225291 | 9/1997 |
| JP | 2002-119841 | 4/2002 |

(Continued)

OTHER PUBLICATIONS

International Search Report and Written Opinion issued in International Patent Application No. PCT/KR2017/003050, dated Jul. 31, 2017.

(Continued)

*Primary Examiner* — Natasha E Young
(74) *Attorney, Agent, or Firm* — Norton Rose Fulbright US LLP

(57) ABSTRACT

Apparatus for producing fine particles having a particle formation mechanism and a particle-outlet micro-channel may include a unit-structure including first and second portions adjacent to each other; and a first inlet defined in the first portion at a first height. A continuous phase solution is injected into the first inlet; and a second inlet is defined in the first portion at a second height different from the second height. A dispersed phase solution is injected into the second inlet. A merging volume is defined in the second portion and is defined at third height equal to either the first height and the second height, or has a value therebetween. The continuous phase solution and the dispersed phase solution are (Continued)

merged in the merging volume, wherein fine particles are formed. A first micro-channel and a second micro-channel branching from the merging volume communicates with the first inlet and the second inlet, respectively.

18 Claims, 5 Drawing Sheets

(51) Int. Cl.
| | |
|---|---|
| *B01J 2/06* | (2006.01) |
| *B01J 4/00* | (2006.01) |
| *B01J 8/00* | (2006.01) |
| *B01J 19/00* | (2006.01) |
| *C08J 3/00* | (2006.01) |
| *C08J 3/12* | (2006.01) |
| *B01F 3/08* | (2006.01) |
| *B01F 5/02* | (2006.01) |
| *B01F 13/00* | (2006.01) |
| *B01F 5/00* | (2006.01) |

(52) U.S. Cl.
CPC ............ *B01F 13/0059* (2013.01); *B01J 2/00* (2013.01); *B01J 2/06* (2013.01); *B01J 4/00* (2013.01); *B01J 19/0053* (2013.01); *B01J 19/0093* (2013.01); *C08J 3/12* (2013.01); B01F 2003/0884 (2013.01); B01F 2005/004 (2013.01); B01F 2215/0036 (2013.01); B01J 2219/00786 (2013.01); B01J 2219/00792 (2013.01); B01J 2219/00889 (2013.01); B01J 2219/00894 (2013.01); B01J 2219/00898 (2013.01); B01J 2219/2474 (2013.01); B01J 2219/318 (2013.01)

(58) Field of Classification Search
CPC .... B01F 5/0256; B01F 13/00; B01F 13/0059; B01F 13/0061; B01F 13/0066; B01F 2003/0884; B01F 2005/00; B01F 2005/0002; B01F 2005/0037; B01F 2005/004; B01F 2215/00; B01F 2215/0001; B01F 2215/0036; B01J 2/00; B01J 2/02; B01J 2/06; B01J 4/00; B01J 8/00; B01J 8/008; B01J 13/00; B01J 13/02; B01J 13/025; B01J 19/00; B01J 19/0053; B01J 19/0093; B01J 2219/00; B01J 2219/00781; B01J 2219/00783; B01J 2219/00786; B01J 2219/00788; B01J 2219/00792; B01J 2219/00889; B01J 2219/00894; B01J 2219/0898; B01J 2219/025; B01J 2219/24; B01J 2219/2401; B01J 2219/245; B01J 2219/2474; B01J 2219/30; B01J 2219/318; C08J 3/00; C08J 3/12
See application file for complete search history.

(56) References Cited

FOREIGN PATENT DOCUMENTS

| | | |
|---|---|---|
| KR | 1999-0067311 | 8/1999 |
| KR | 2008-0020954 | 3/2008 |

OTHER PUBLICATIONS

Steegmans et al., "Characterization of Emulsification of Flat Microchannel Y Junctions," *Langmuir*, 2009, 25:3396-3401.

\* cited by examiner

【FIG. 1】
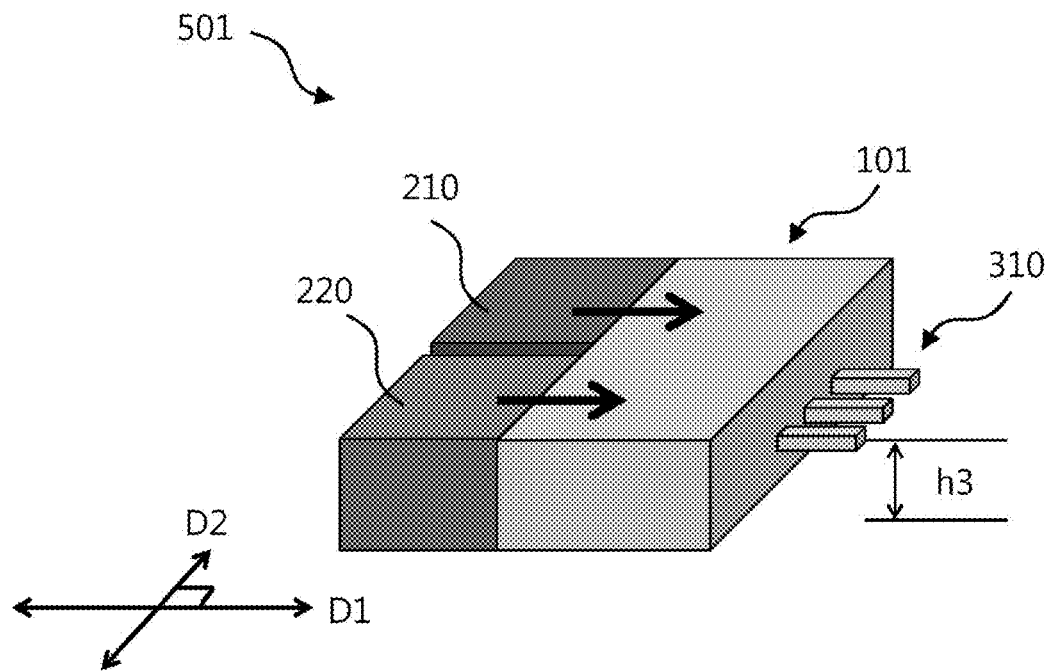
【FIG. 2】
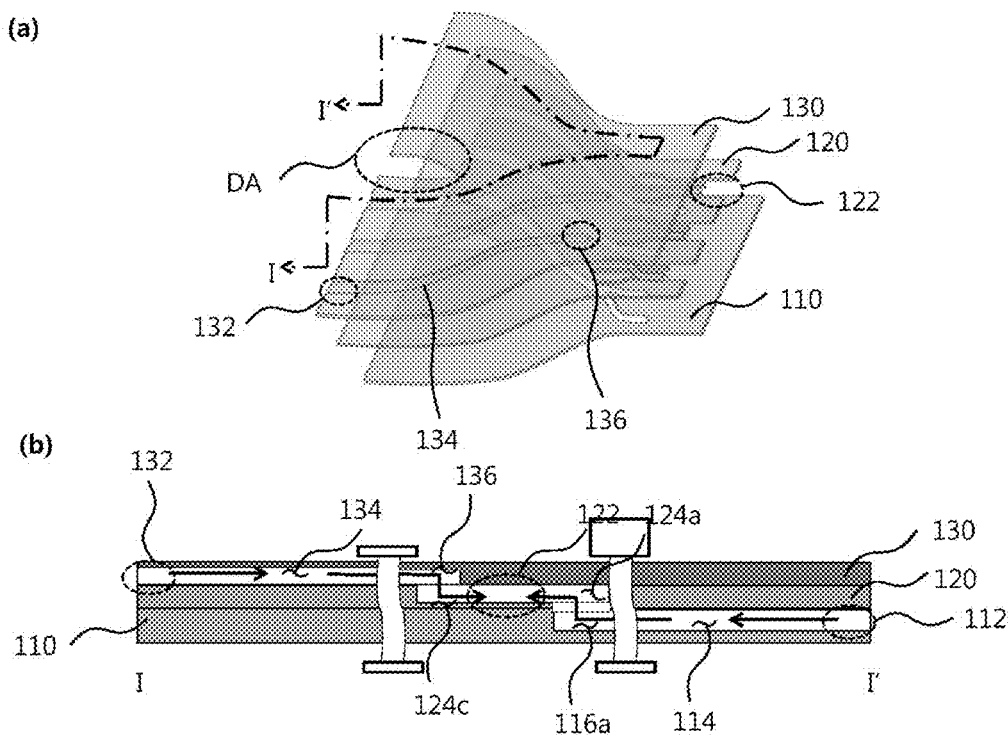

[FIG. 3]
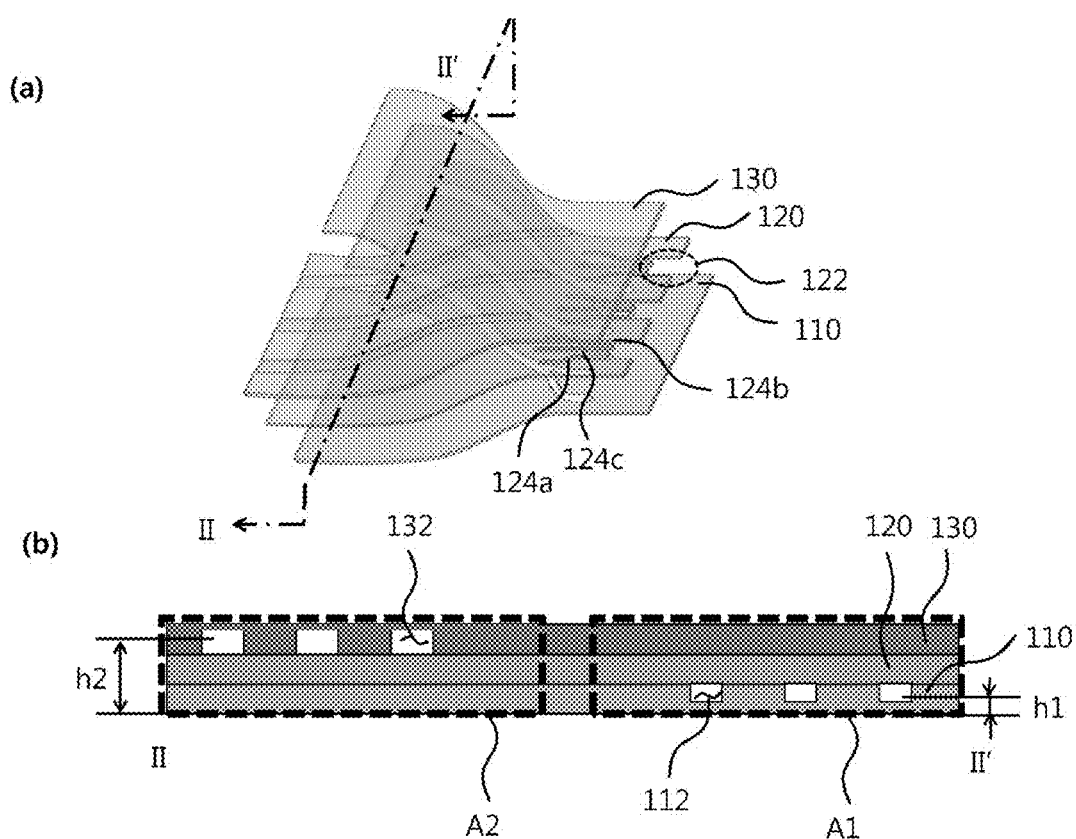

[FIG. 4]
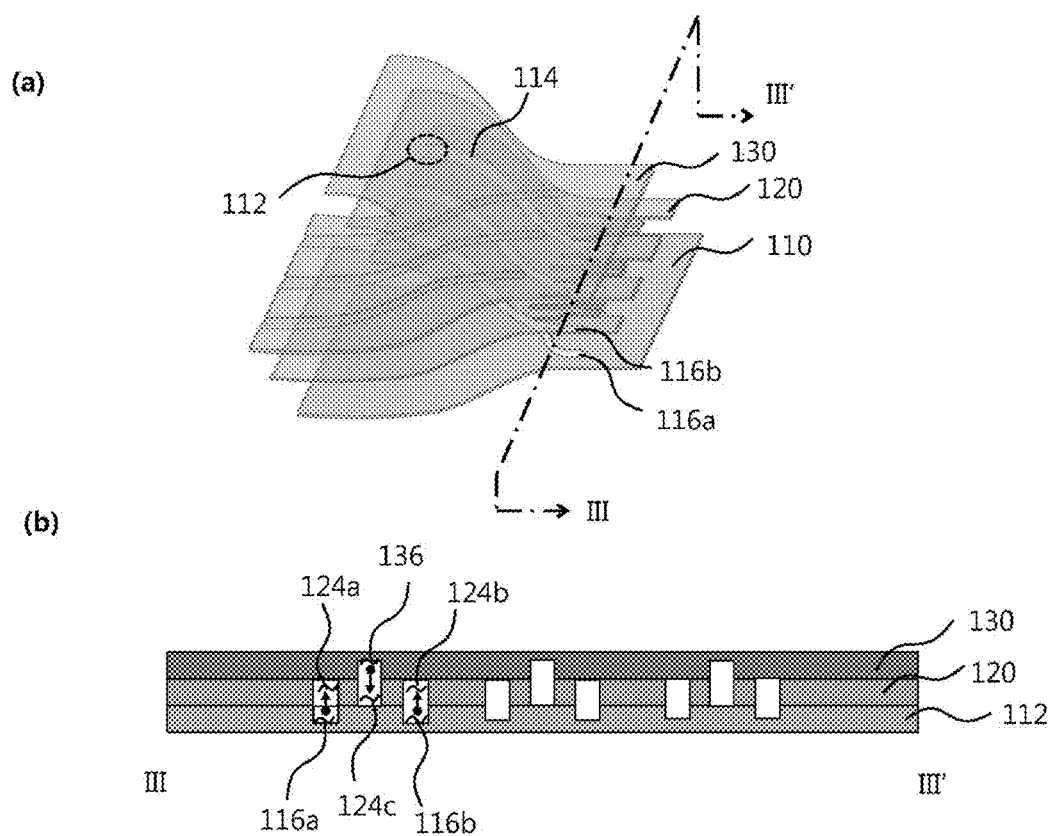

【FIG. 5】
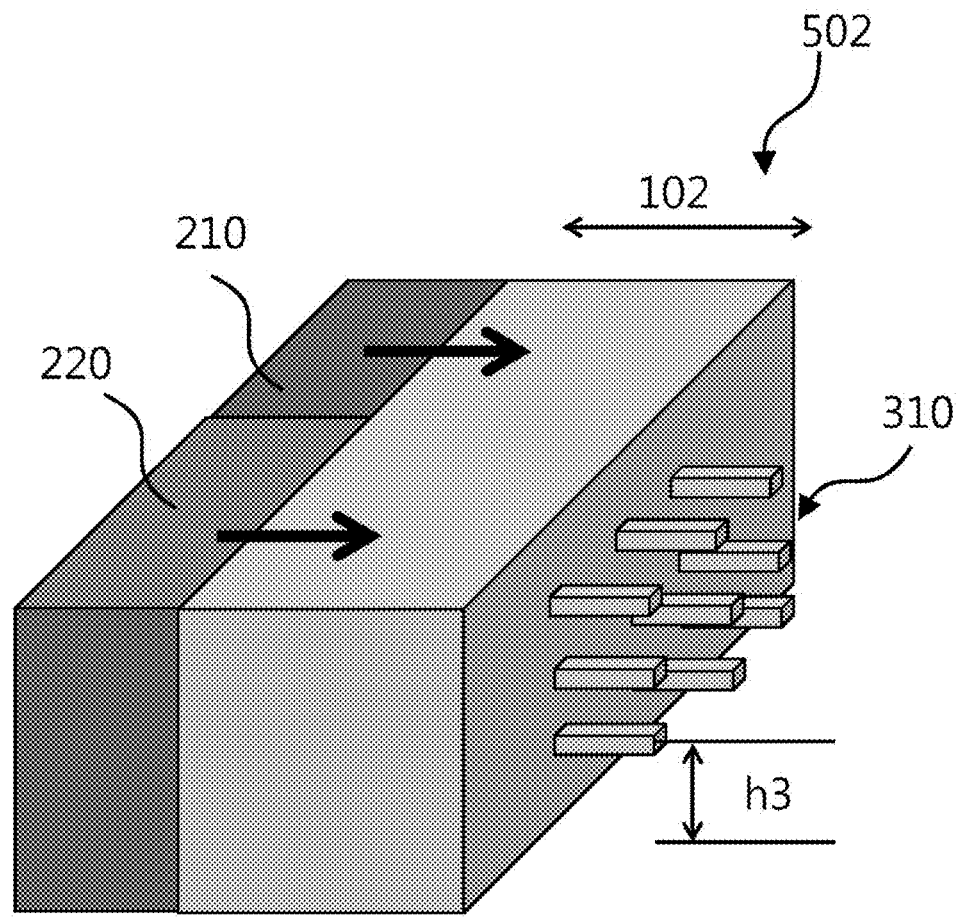
【FIG. 6】
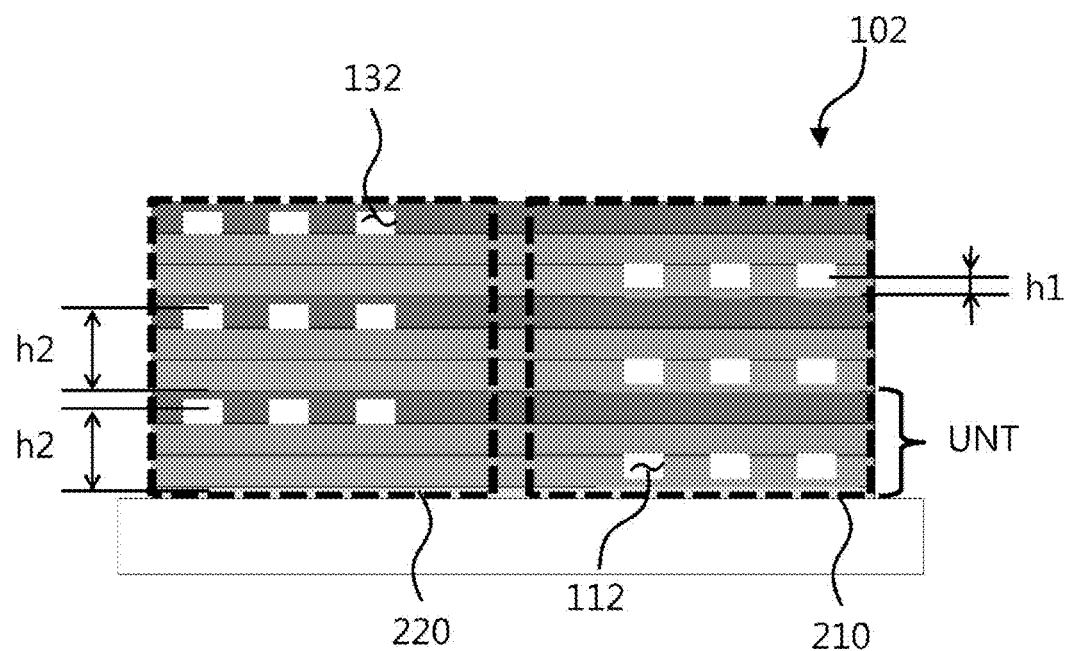

【FIG. 7】
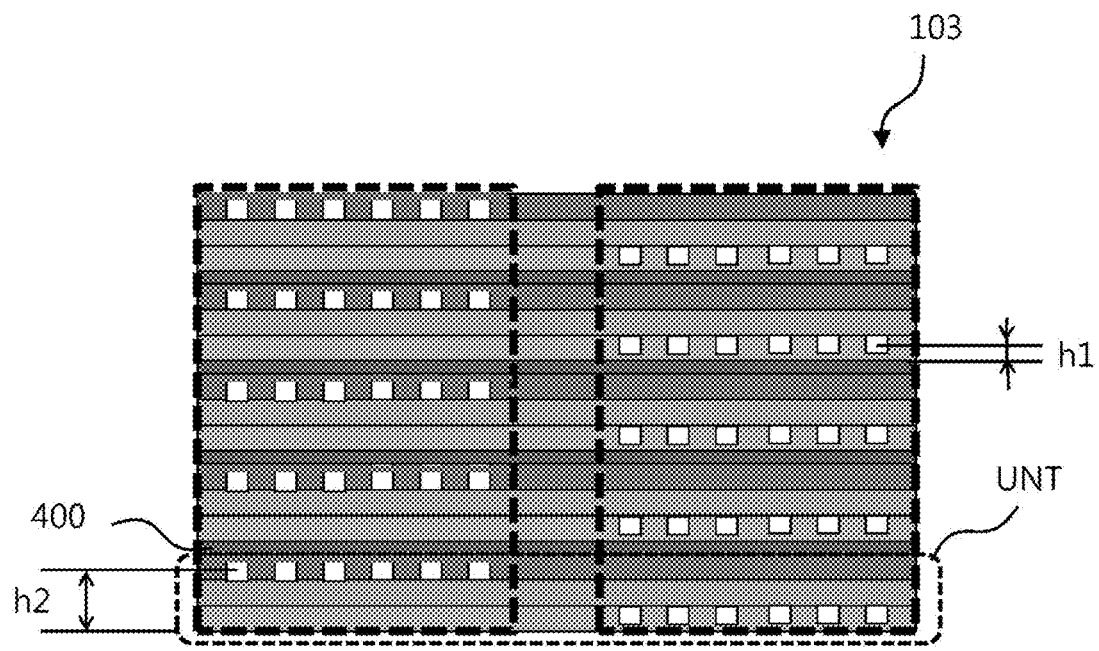
【FIG. 8】
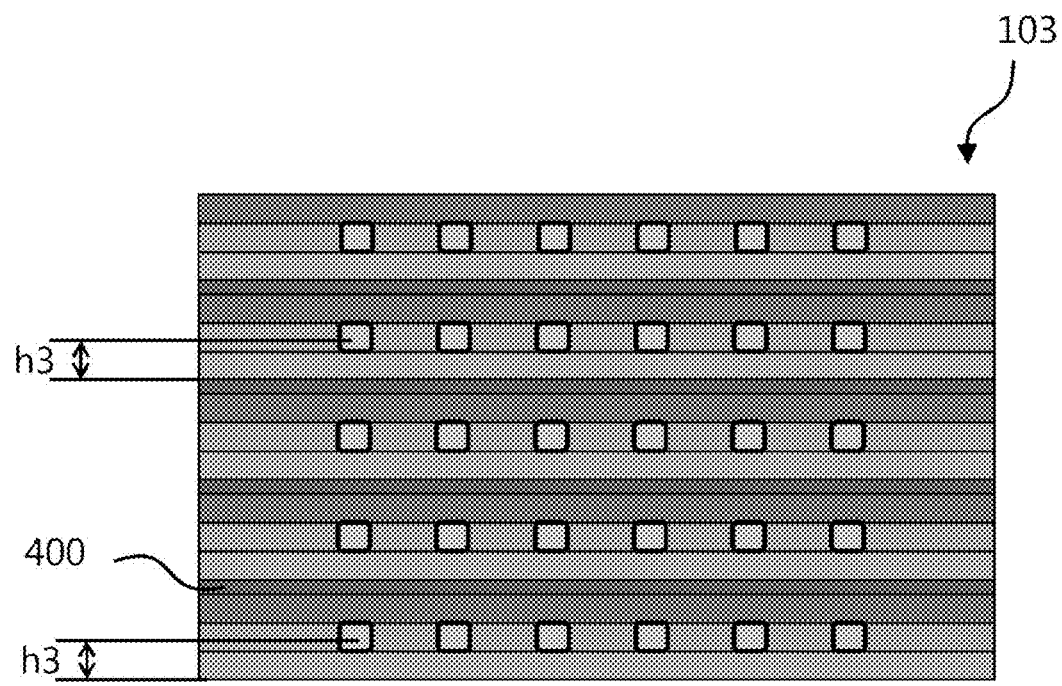

FINE PARTICLE MANUFACTURING DEVICE

This application is a national phase application under 35 U.S.C. § 371 of International Application No. PCT/KR2017/003050, now WO 2017/164636 A1, filed Mar. 22, 2017 which claims priority to Korean Application Number 10-2016-0033996 filed Mar. 22, 2016, each of which is incorporated here by reference in its entirety.

TECHNICAL FIELD

The present disclosure relates to an apparatus for producing fine particles. More particularly, the present disclosure relates to an apparatus that can mass produce fine particles of uniform size.

BACKGROUND ART

Generally, fine particles such as spherical microparticles having a diameter of several to several hundreds of micrometers or nanoscale nanoparticles are utilized in various fields such as drug delivery systems, small electronic circuits, and optical devices. It is very important to uniformly prepare the particles in order for the particles to be efficiently utilized in these fields, In one example, fine particles made of polymer can minimize the consumption of heat energy during forming thereof and minimize the defect rate due to bubble generation. There is a further advantage in that the functional thin film can be coated on the surface of such particles. As a result, the application range of the particles including the air-permeable formed article, the permeation filter, the porous body, the adsorption sheet and the antistatic sheet is very wide. Thus, mass production of the particles of uniform size is required. The fine particles formed of polymer are manufactured by general mechanical grinding, mechanical stirring, high-speed spraying, thermo-electrospinning, etc. However, while these conventional methods have the advantage of mass production of the particles, the size distribution of the produced particles is large, which may entail a post-treatment process for classification thereof. Further, it is difficult to control the size of the fine particles as produced.

Further, in the field of biotechnology, medicine, biochemistry, etc., a capsule type fine particle having a structure comprising a core composed of a biological material such as a cell and a protective layer for protecting the surface of the core, or a capsule type fine particle having a structure including an active material layer supported on the surface of a core carrier are used for analysis, measurement or treatment. These capsule-type fine particles are manufactured by a prilling method, a spraying method, an emulsion method. However, according to these methods, it is difficult to manufacture fine particles of a uniform size and there is a limit in mass production of the particles.

Thus, there is an urgent need to develop a technology by which it is possible to control the size of fine particles via simple processes in various technical fields, the size uniformity of the fine particles can be improved, and at the same time, and which is capable of mass production on a commercial scale.

DISCLOSURE OF THE INVENTION

Technical Purpose

The purpose of the present disclosure is to provide an apparatus for producing fine particles, which can control spherical fine particles via a simple process and can mass-produce the fine particles in a uniform size.

Technical Solutions

In one aspect, the present disclosure provides an apparatus for producing fine particles, the apparatus comprising: a particle formation mechanism including a unit-structure, wherein the unit-structure includes: first and second portions adjacent to each other; a first inlet defined in the first portion at a first height, wherein a continuous phase solution is injected into the first inlet; a second inlet defined in the first portion at a second height different from the second height, wherein a dispersed phase solution is injected into the second inlet; a merging volume defined in the second portion adjacent to the first portion, wherein the merging volume is defined at third height, wherein the third height is equal to either the first height and the second height, or has a value between the first height and the second height, wherein the continuous phase solution and the dispersed phase solution are merged in the merging volume, wherein fine particles are formed via the merging between the continuous phase solution and the dispersed phase solution in the merging volume; and a first micro-channel and a second micro-channel branching from the merging volume so as to be in communication with the first inlet and the second inlet, respectively; and a particle-outlet micro-channel in communication with the merging volume in the particle formation mechanism, wherein the particle-outlet micro-channel is constructed to flow the fine particles formed from the merging volume in a first direction and discharge the particles to an outside of the apparatus, wherein the first micro-channel is in communication with a first sub-channel and a second sub-channel branched from the merging volume, wherein the second micro-channel is in communication with a third sub-channel disposed between the first and second sub-channels, wherein the continuous phase solution and the dispersed phase solution flow via the first to third sub-channels into the merging volume.

In one embodiment, in the merging volume, the first micro-channel is in communication with two branched distal channels. In one embodiment, each of the two distal channels communicates with each of the first and second sub-channels. In one embodiment, the two distal channels are defined at the first height, wherein a first distal channel of the two distal channels communicates with the first sub-channel in a vertical direction, wherein the second distal channel thereof communicates with the second sub-channel in a vertical direction.

In one embodiment, the unit-structure includes: a lower plate in which the first inlet and the first micro-channel are defined; an upper plate in contact with the lower plate, wherein the second inlet and the second micro-channel are defined in the upper plate; and a middle plate interposed between the lower and upper plates, wherein the first to third sub-channels are defined in the middle plate. In one embodiment, in the unit structure, the lower plate, the middle plate, and the upper plate are joined and connected to each other. In one embodiment, the first inlet and the first micro-channel are formed by partially etching the lower plate from a face to be etched thereof toward an opposite face thereto to partially open the face to be etched such that the opposite face to the face to be etched remains; wherein the second inlet and the second micro-channel are formed by partially etching the upper plate from a face to be etched thereof toward an opposite face thereto to partially open the face to be etched such that the opposite face to the face to be etched remains; and wherein the first to third sub-channels are formed by partially etching the middle plate from a face to be etched thereof toward an opposite face thereto to partially open the face to be etched such that the opposite face to the face to be etched remains, wherein the open face of the lower plate is coupled to and face the face opposite to the open face of the middle plate, wherein the open face of the upper plate faces and is coupled to the open face of the middle plate.

In one embodiment, in the unit-structure, a number of each of first inlets, second inlets, first micro-channels, second micro-channels, and merging volumes is x, wherein x is a natural number of 2 or larger, wherein the x merging volumes are arranged in a line within the second portion of the unit-structure, wherein the x first micro-channels communicating with the x merging volumes respectively are arranged in parallel and spaced apart from each other in one direction, wherein the x first inlets are arranged in a row in the first portion, wherein the x second micro-channels communicating with the x merging volumes respectively are arranged in parallel and spaced apart from each other in another direction crossing said one direction, wherein the x second inlets are arranged in a row in the first portion. In one embodiment, channel lengths of the first micro-channels are equal to each other, wherein channel lengths of the second micro-channels are equal to each other. In one embodiment, the unit-structure includes: a first region of the first portion where the x first inlets are formed; a second region of the first portion where the x second inlets are formed; and a separation groove defined between the first and second regions for separating the first region from the second region.

In one embodiment, the particle formation mechanism comprises at least two unit-structures, wherein the two or more unit-structures are sequentially stacked. In one embodiment, the apparatus further comprises: a first solution supply for supplying the continuous phase solutions at the same flow rate to the first inlets in the two or more unit-structures; and a second solution supply for supplying the dispersed phase solutions at the same flow rate to the second inlets in the two or more unit-structures. In one embodiment, an outlet of the first solution supply for releasing the continuous phase solution to the first inlets is constructed to communicate simultaneously with all of the first inlets, wherein an outlet of the second solution supply for releasing the dispersed phase solution to the second inlets is constructed to communicate simultaneously with all of the second inlets.

In one embodiment, the particle formation mechanism comprises at least two unit-structures, wherein the two or more unit-structures are sequentially stacked. In one embodiment, the unit-structures are stacked to form a vertical stack. In one embodiment, the unit-structures are diffusion-bonded to one another or are brazing-boned to one another.

In one embodiment, the apparatus further comprises: a first solution supply in communication with the first inlet to supply the continuous phase solution thereto; and a second solution supply in communication with the second inlet to supply the dispersed phase solution thereto.

In one embodiment, the particle-outlet micro-channel comprises an outlet pipe in communication with the merging volume.

Technical Effect

According to the apparatus for producing the fine particles of the present disclosure described above, the spherical fine particles can be manufactured via a simple process using the droplet flow characteristics. In this connection, the size of the fine particles can be easily controlled, and the particles can be mass-produced commercially in a uniform size. The present apparatus may be applied to all technical fields requiring mass production of the spherical fine particles such as polymer particles or microcapsules. In this area of technology, the productivity of the fine particles can be improved while the reliability of manufacturing fine particles can also be improved.

BRIEF DESCRIPTION OF THE DRAWINGS

FIG. 1 is a perspective view illustrating an apparatus for producing fine particles according to one embodiment of the present disclosure.

FIG. 2 through FIG. 4 illustrate a particle formation mechanism of FIG. 1.

FIG. 5 is a perspective view illustrating an apparatus for producing fine particles according to another embodiment of the present disclosure.

FIG. 6 shows a structure of the particle formation mechanism as viewed from a source-material supply in FIG. 5.

FIG. 7 shows a structure of a particle formation mechanism as viewed from a source-material supply in an apparatus for producing fine particles according to still another embodiment of the present disclosure.

FIG. 8 shows a structure of a particle formation mechanism of FIG. 7 viewed from a particle outlet.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure. For simplicity and clarity of illustration, elements in the figures are not necessarily drawn to scale. The same reference numbers in different figures denote the same or similar elements, and as such perform similar functionality.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating an apparatus for producing fine particles according to one embodiment of the present disclosure.

Referring to FIG. 1, an apparatus 501 for producing fine particles includes a particle formation mechanism 101 and a particle-outlet micro-channel 310. The apparatus 501 for producing fine particles may further include a first solution supply 210 and a second solution supply 220.

The particle formation mechanism 101 is constructed to produce fine particles using a continuous phase solution and a dispersed phase solution. The particle formation mechanism 101 may receive a continuous phase solution through the first solution supply 210 and a dispersed phase solution through the second solution supply 220. The continuous phase solution means a liquid state dispersion medium, while a dispersed phase solution means a liquid state dispersoid. The particle formation mechanism 101 will be described in detail below with reference to FIGS. 2 to 4.

The apparatus 501 for producing fine particles may be a system configured to manufacture fine particles using the continuous phase solution and dispersed phase solution based on a microfluidic system. The first and second solution supplies 210 and 220 supply the continuous phase solution and the dispersed phase solution, respectively, to the particle formation mechanism 101 in the first direction D1. The fine particles formed in the particle formation mechanism 101 flow through the particle-outlet micro-channel 310 in the first direction D1 and are discharged to the outside. In this connection, the first and second solution supplies 210 and 220 are spaced from each other by the second direction D2, which intersects the first direction D1.

The particle-outlet micro-channel 310 is configured to communicate with the particle formation mechanism 101 and to discharge fine particles formed from the particle formation mechanism 101 in one direction to the outside. The particle-outlet micro-channel 310 may include at least one outlet pipe. The fine particles formed from the particle formation mechanism 101 flow in the first direction D1 along the outlet pipe. This channel may remove the dispersion medium or solvent, and then only fine particles in the solid phase may be discharged to the outside.

FIG. 2 through FIG. 4 illustrate the particle formation mechanism of FIG. 1.

In each of FIG. 2 to FIG. 4, a represents an exploded perspective view of the particle formation mechanism 101. FIG. 2b is a cross-sectional view taken along a line I-I' of FIG. 2a. FIG. 3b is a cross-sectional view along a line II-II' in FIG. 3a. FIG. 4b is a cross-sectional view taken along a line III-III' of FIG. 4a.

Referring to FIG. 2 to FIG. 4, the particle formation mechanism 101 includes a first inlet 112, a second inlet 132, a merging volume 122, first and second micro-channels 114 and 132, and first to third sub-channels 124a and 124b and 124c.

The first inlet 112 is disposed in a first side portion of the particle formation mechanism 101 and has a first height h1. A continuous phase solution is injected into the first inlet. The first inlet 112 may communicate with the first solution supply 210. The first height h1 of the first inlet 112 means the distance from the reference plane on which the particle formation mechanism 101 is disposed to the vertical center of the first inlet 112. The vertical center of the first inlet 112 may be one-half of the height direction length of the first inlet 112.

The second inlet 132 is disposed in the first side portion of the particle formation mechanism 101 and has a second height h2 different from the first height h1. A dispersed phase solution is injected into the second inlet. The second inlet 132 may communicate with the second solution supply 220. The second height h2 of the second inlet 132 means the distance from the reference plane on which the particle formation mechanism 101 is disposed to the vertical center of the second inlet 132. The vertical center of the second inlet 132 may be one-half of the height direction length of the second inlet 132.

The merging volume 122 is disposed in a second side portion of the particle formation mechanism 101 adjacent to the first side portion and has a third height h3. In the merging volume 122, the continuous phase solution and the dispersed phase solution join each other. In this connection, the third height h3 is a distance between the center of the height of the merging volume 122, which may be defined as a half of the height direction length of the merging volume 122, and the reference plane. In one example, the third height h3 may be equal to the first height h1 or the second height h2. Alternatively, the third height h3 may have a value between the first height h1 and the second height h2. When the merging volume 122 is placed at the third height h3, the outlet pipe may also be disposed in the second side portion at the third height h3.

The merging volume 122 is in communication with the first to third sub-channels 124a and 124b and 124c. The first and second sub-channels 124a and 124b communicate with the first micro-channel 114. The third sub-channel 124c communicates with the second micro-channel 132. The first and second sub-channels 124a and 124b are formed to branch from the merging volume 122. The third sub-channel 124c is disposed between the first and second sub-channels 124a and 124b. The first and second sub-channels 124a and 124b receive a continuous phase solution from the first micro-channel 114. The third sub-channel 124c receives the dispersed phase solution from the second micro-channel 132. In the merging volume 122, the continuous phase solution and the dispersed phase solution are merged.

The first micro-channel 114 communicates with the first inlet 112 and merging volume 122. The first micro-channel 114 is in communication with the merging volume 122 through the first and second sub-channels 124a and 124b. Specifically, the first micro-channel 114 is in communication with two distal channels 116a and 116b branching from the merging volume 122. Each of the two distal channels 116a and 116b may communicate with each of the first and second sub-channels 124a and 124b. All of the first inlet 112, the first micro-channel 114 and the two distal channels 116a and 116b are formed at the first height h1 from the reference plane. Both the first and second sub-channels 124a and 124b and the merging volume 122 are formed at the third height h3 from the reference plane. The two distal channels 116a and 116b and the first and second sub-channels 124a and 124b may communicate with each other in a vertical direction.

Further, the second micro-channel 134 is in communication with the second inlet 132 and the merging volume 122. The second micro-channel 134 is in communication with the merging volume 122 via the third sub-channel 124c. Specifically, the second micro-channel 134 is in communication with the distal channel 136 to adjacent to the merging volume 122. The distal channel 136 may communicate with the third sub-channel 124c. The second inlet 132, the second micro-channel 134 and the distal channel 136 are all formed at the second height h2 from the reference plane. The third sub-channel 124c is formed at a third height h3 from the reference plane. The distal channel 136 and the third sub-channel 124c may communicate with each other in a vertical direction.

In one example, the second height h2 is higher than the first height h1 and the third height h3 has a value between the first and second heights h1 and h2. In this case, the continuous phase solution may be provided into the merging volume 122 through the first micro-channel 114 and through the two distal channels 116a and 116b and through the first and second sub-channels 124a and 124b. At the same time, the dispersed phase solution may be provided into the merging volume 122 through the second micro-channel 134 and through the distal channel 136 and through the third sub-channel 124c. That is, the continuous phase solution flows along the first micro-channel 114 and then moves upward in the particle formation mechanism 101, while the dispersed phase solution flows along the second micro-channel 134 and then moves downward within the particle formation mechanism 101. As such, the continuous phase solution and the dispersed phase solution may be joined together in the merging volume 122.

In one embodiment, the particle formation mechanism 101 may have at least two or more of the first inlets 112 formed therein. In this connection, x is a natural number greater than or equal to 2. The first inlets 112 may be arranged in a line along the second direction D2 and spaced apart from each other along the second direction D2. In this connection, the number of the second inlets 132 may also have the same number of x as the number of the first inlets 112. The number of each of the first and second micro-channels 114 and 134 and the merging volume 122 may also be x. Further, the particle-outlet micro-channel 310 may also include x outlet pipes.

In this connection, the x merging volumes 122 may be arranged in a row in the second side portion of the particle formation mechanism 101. The first micro-channels 114 communicating with these portions 122 respectively are spaced in a first direction and are arranged parallel to each other. The first inlets 112 are arranged in a row in the first side portion. The x second micro-channels 134 are spaced and parallel to each other in a second direction crossing the first direction. The second inlet 132 may be arranged in a row in the first side portion. The channel lengths of the x first micro-channels 114 are preferably the same. The channel lengths of the x second micro-channels 132 are preferably equal to each other. The channel length means a length of a flow path through which the solution flows from a portion where one solution is injected to a portion where the one solution is discharged. In the case of the first micro-channel 114, the channel length is the distance from the first inlet 112 to the distal channels 116a and 116b. In the case of the second micro-channel 134, the channel length may be the distance from the second inlet 132 to the distal channel 136. Since the channel lengths of the x first micro-channels 114 are configured to be equal to each other, the continuous phase solutions supplied to the first inlets 112 respectively may be supplied to the corresponding x merging volumes 122 at substantially the same flow rate respectively. Further, as the channel lengths of the second micro-channels 134 are designed to be equal to each other, the dispersed phase solvents fed to the x second inlets 132 respectively may be fed at substantially the same flow rate to the x merging volumes 122 respectively.

A first region A1 in the first side portion where the x first inlets 112 are formed and a second region A2 in the first side portion where x second inlets 132 are formed are separated from each other and placed on the same plane. In the first side portion, and between the first region A1 and the second region A2, a separation groove DA may be formed that physically separates these regions. The first region A1, which is separated by the separation groove DA, is inserted into the first solution supply 210. This allows the first solution supply 210 and the first region A1 to communicate with each other. The second region A2 is inserted into the second solution supply 220. This allows the second solution supply 220 and the second region A2 to communicate with each other. An outlet of the first solution supply 210 communicates simultaneously with all of the x first inlets 112, while an outlet of the second solution supply 220 communicates simultaneously with all of the x second inlet ports 132. As a result, the continuous phase solutions may be supplied at the same flow rate to the x first inlets 112, while the dispersed phase solution may be fed at the same flow rate to the x second inlets 132.

In one embodiment, the particle formation mechanism 101 may comprise three plates 110, 120 and 130. A lower plate 110 and an upper plate 130 are arranged to face each other. A middle plate 120 may be interposed therebetween. Each of the lower, middle and upper plates 110, 120 and 130 may be formed of a metal or an alloy. In this connection, they may be joined together and connected to each other. As a method for bonding them each other, diffusion jointing may be used.

In the lower plate 110, the first inlet 112 and the first micro-channel 114 are formed. The first inlet 112 and the first micro-channel 114 may be formed by etching a portion of the lower plate 110 corresponding to the target region. Accordingly, the lower plate 110 is etched from the to-be-etched face, which is one face, toward the opposite face thereto. As a result, the etched face of the region corresponding to the first inlet 112 and the first micro-channel 114 is opened. The opposite face to the etched face of the lower plate 110 may remain. The plate 110 may be disposed on the reference plane such that the remaining opposite face of the lower plate 110 acts as the bottom of the lower plate 110. Further, the first and second distal channels 116a and 116b are formed in the lower plate 110. Accordingly, all of the portions formed in the lower plate 110 may be disposed at the same height with respect to the reference plane. The first and second distal channels 116a and 116b may communicate with the first and second sub-channels 124a and 124b in the middle plate 120 in a vertical direction. When the number of each of the first inlet 112 and the first micro-channel 114 is plural x, the first inlets 112 are arranged in a line in the lower plate 110 along the second direction D2. The first micro-channels 114 may be arranged parallel to each other in the lower plate 110 and spaced apart from each other. However, the first inlets 112 are located only in the first region A1.

In the middle plate 120, the merging volume 120 and the first to third sub-channels 124a and 124b and 124c are formed. Thus, the intermediate plate is disposed on the lower plate 110. The first sub-channel 124a and the second sub-channel 124b are formed by partially opening the lower surface of the middle plate 120. The first sub-channel 124a and the second sub-channel 124b are overlapped with and communicate with the first and second distal channels 116a and 116b in the lower plate 110 in the vertical direction. The third sub-channel 124c is formed by opening a part of the top face which is the to-be-etched face of the middle plate 120 in the target region. The third sub-channel 124c overlaps and communicates with the distal channel 136 in communication with the second micro-channel 134 in the upper plate 130 in a vertical direction. That is, the first and second sub-channels 124a and 124b having a lower face-open shape are overlapped with the first and second distal channels 116a and 116b. As such, the first and second sub-channels 124a and 124b and the first and second distal channels 116a and 116b may overlap and communicate with each other in a vertical direction. When the x merging volumes 120, x being larger than 1 are formed, the x merging volumes 120 may be arranged in a line along the second direction D2. In a region of the lower plate 110, except for the region corresponding to the first and second distal channels 116a and 116b, the etched face of the lower plate 110 corresponding to the first micro-channel 114 is opened. The face opposite to the etched face of the middle plate 120 remains. This remaining surface faces the etched face of the lower plate 110. Thus, the first micro-channel 114 is an independent channel and is separated in the vertical direction. In this connection, only vertical directions of flow are possible in the first and second distal channels 116a and 116b.

In the upper plate 130, the second inlet 132 and the second micro-channel 134 are formed. The distal channel 136 communicating with the second micro-channel 134 is formed in the upper plate 130. The second inlet 132 and the second micro-channel 134 may be formed by partially etching the upper plate 130. Thus, the top plate is partially etched from the to-be-etched face of the upper plate 130 to the opposite face thereto. The opposite face of the upper plate 130 to the etched face remains so that the remaining opposite face of the upper plate 130 acts as the upper face of the upper plate 130. In this connection, the upper plate 130 may be disposed on the middle plate 120 such that the etched face of the upper plate 110 abuts the middle plate 120. In this connection, the etched face of the upper plate 110 is coupled to the etched face of the middle plate 120. Thus, the third sub-channel 124c overlaps the distal channel 136, which is in communication with the second micro-channel 134. Thus, the distal channel 136 communicating with the second micro-channel 134, and the third sub-channel 124c may communicate with each other in the vertical direction. In this connection, although the etched face of the upper plate 130 is disposed in the downward direction with respect to the reference plane, the etched face of the middle plate 120 facing the second micro-channel 134 of the upper plate 130 becomes a flat region without being opened. In this way, vertical direction flow is possible only in the distal channel 136 of the upper plate 130. In other regions, a flow path having an independent structure is formed. When the number of each of the second inlet 132 and the second micro-channel 134 is x, x being larger than 1, the x second inlets 132 are arranged in a line along the second direction D2 in the upper plate 130. The x second micro-channels 134 may be arranged parallel to each other in the upper plate 130 and spaced apart from each other. The second inlets 132 are located only in the second region A2.

The triple layers shown in FIGS. 2 to 4 have a sequential stack structure of the plates 110, 120 and 130. The distal channels 116a, 116b, and 136 formed in the upper and lower plates 110 and 130 communicate with the first to third sub-channels 124a and 124b and 124c in the middle plate 120 in a vertical direction. Thus, these elements may be positioned to have a corresponding one of the first height h1, the second height h2, and the third height h3.

As illustrated in FIG. 2 to FIG. 4, a single particle forming mechanism 101 may constitute a microfluidic system which may form a plurality of fine particles. According to the present disclosure, it is also possible to easily mass-produce fine particles of uniform size.

In one embodiment, the configuration in which the dispersed phase solution and the continuous phase solution may be injected into the lower, middle and upper plates 110, 120 and 130, respectively and then the solutions may flow in the plates may be achieved via the etching process. Further, the lower, middle and upper plates 110, 120 and 130 may be joined together to produce a single structure. In FIG. 2 to FIG. 4, each of the structures, in which the dispersed phase solution and the continuous phase solution were injected and flowed therein, was formed by partially etching the lower, middle and upper plates 110, 120 and 130. In this regard, the face opposite to the etched face remains. This configuration may be just one example. Alternatively, however, etching the entire plate in a vertical direction in an integral manner E, that is, integrally etching from the face to be etched to the opposite face to the face to be etched, a channel structure penetrating in a vertical direction in the plate may be formed. Then, joining a flat base substrate below the lower plate 110 thereto may allow the particle formation mechanism 101 to be constructed. That is, an independent path of the first micro-channel 114 in the lower plate 110 may be constructed via blocking the solution flow in the vertical direction by the separate flat base substrate and the middle plate 120 disposed thereon. An independent path of the second micro-channel 134 may be configured via blocking the solution flow in the vertical direction by the middle plate 120 and another base substrate disposed thereon.

FIG. 2 to FIG. 4 illustrate an example in which the particle formation mechanism 101 as illustrated includes a single unit-structure UNT (see FIG. 6). In this example, a single unit-structure UNT (see FIG. 6) includes the first inlet 112, the second inlet 132, merging volume 122, the first and second micro-channels 114 and 132. However, the present disclosure is not so limited. Alternatively, at least two unit-structures are vertically stacked such that a microfluidic system capable of mass production of the fine particles can be constructed. Such an alternative embodiment will be described later with reference to FIGS. 5 to 8. In the following description of alternative embodiments, the descriptions overlapping with those illustrated in FIGS. 1 to 4 are omitted. Differences between the above embodiment and the present alternative embodiment will be exemplified.

FIG. 5 is a perspective view illustrating an apparatus for producing fine particles according to another embodiment of the present disclosure. FIG. 6 shows a structure of the particle formation mechanism as viewed from a source-material supply in FIG. 5. In this connection, the source-material supply side portion refers to one side portion of the particle-forming mechanism 102 to which the first and second solution supplies 210 and 220 are coupled.

Referring to FIGS. 5 and 6, an apparatus 502 for producing fine particles includes a particle-forming mechanism 102 and a particle-outlet micro-channel 310. The apparatus 502 may further include first and second solution supplies 210 and 220. Except for the fact that the particle-outlet micro-channel 310 includes a plurality of outlet pipes, and for the structure of the particle-forming mechanism 102, the apparatus 501 for producing the fine particles illustrated in FIGS. 1 to 4 and the apparatus 502 for producing the fine particles in this embodiment are substantially identical to each other. Thus, details about the overlapping portions are omitted.

Referring to FIG. 6 with FIG. 2 to FIG. 4, the particle formation mechanism 102 includes at least two unit-structures UNTs. The unit-structures UNT are stacked in a vertical direction. In this connection, each unit-structure UNT may be composed of the three plates 110, 120 and 130 as illustrated in FIG. 2 to FIG. 4. The unit-structures UNTs are stacked together such that the first regions A1 thereof in which the first inlets 112 are formed are superimposed in a vertical direction. The unit-structures UNTs are stacked together so that the second regions A2 in which the second inlets 132 are formed overlap each other in the vertical direction. The unit-structures UNTs are stacked together such that the outlet of the first solution supply 210 for supplying the continuous phase solution to the first inlet 112 communicates simultaneously with all of the first inlets 112, and such that the outlet of the second solution supply 220 for supplying the dispersed phase solution to the second inlets 132 is in communication with all of the second inlet ports 132 at the same time.

For the single unit-structure UNT, the three plates 110, 120 and 130 may be connected to one another via diffusion bonding. Further, when the particle-forming mechanism includes two or more unit-structures UNTs, the unit-structures UNTs may be connected to each other via a diffusion junction.

In FIG. 5 and FIG. 6, each unit-structure UNT contains three respective first and second inlets 112 and 132. Then, three such unit-structures UNTs are stacked. This creates a particle-outlet micro-channel 310 in communication with a total of nine outlet pipes. This configuration may be just one example. The present disclosure is not so limited. Alternatively, changing the numbers of the first and second inlets 112 and 132, as shown in FIGS. 7 and 8 may allow many fine particles to be produced at the same time and to eb discharged into the outlet pipes, thereby to mass-produce the fine particles.

FIG. 7 shows a structure of a particle formation mechanism as viewed from a source-material supply in an apparatus for producing fine particles according to still another embodiment of the present disclosure. FIG. 8 shows a structure of a particle formation mechanism of FIG. 7 viewed from a particle outlet.

Referring to FIGS. 7 and 8, a brazing sheet 400 may be interposed between the unit-structures UNTs contained within the particle-forming mechanism 103. The brazing sheet 400 may allow the unit-structures UNT to be brazed-connected to each other. After the brazing sheet is interposed between the unit-structures UNTs, the unit structures UNTs may be connected to each other by applying heat to the resulting brazed-connected unit structures UNTs. When there is a limitation in terms of the coupling force to bond the unit-structures UNTs simply by way of diffusion bonding, further using the brazing sheet 400 may allow the unit-structures UNTs to be more firmly connected to each other.

Although the present disclosure is illustrated above with reference to preferred embodiments of the present disclosure, those skilled in the relevant art will recognize that various modifications and variations may be made to the present disclosure without departing from the spirit and scope of the present disclosure as set forth in the following claims.

What is claimed is:

1. An apparatus for producing fine particles, the apparatus comprising:
    a particle formation mechanism including a unit-structure, wherein the unit-structure includes:
        first and second portions adjacent to each other;
        a first inlet defined in the first portion at a first height, wherein a continuous phase solution is injected into the first inlet;
        a second inlet defined in the first portion at a second height different from the second height, wherein a dispersed phase solution is injected into the second inlet;
        a merging volume defined in the second portion adjacent to the first portion, wherein the merging volume is defined at third height, wherein the third height is equal to either the first height and the second height, or has a value between the first height and the second height, wherein the continuous phase solution and the dispersed phase solution are merged in the merging volume, wherein fine particles are formed via the merging between the continuous phase solution and the dispersed phase solution in the merging volume; and
        a first micro-channel and a second micro-channel branching from the merging volume so as to be in communication with the first inlet and the second inlet, respectively; and
    a particle-outlet micro-channel in communication with the merging volume in the particle formation mechanism, wherein the particle-outlet micro-channel is constructed to flow the fine particles formed from the merging volume in a first direction and discharge the particles to an outside of the apparatus,
    wherein the first micro-channel is in communication with a first sub-channel and a second sub-channel branched from the merging volume,
    wherein the second micro-channel is in communication with a third sub-channel disposed between the first and second sub-channels,
    wherein the continuous phase solution and the dispersed phase solution flow via the first to third sub-channels into the merging volume.

2. The apparatus of claim 1, wherein in the merging volume, the first micro-channel is in communication with two branched distal channels,
    wherein each of the two distal channels communicates with each of the first and second sub-channels.

3. The apparatus of claim 2, wherein the two distal channels are defined at the first height,
    wherein a first distal channel of the two distal channels communicates with the first sub-channel in a vertical direction, wherein the second distal channel thereof communicates with the second sub-channel in a vertical direction.

4. The apparatus of claim 1, wherein the unit-structure includes:
    a lower plate in which the first inlet and the first micro-channel are defined;
    an upper plate in contact with the lower plate, wherein the second inlet and the second micro-channel are defined in the upper plate; and
    a middle plate interposed between the lower and upper plates, wherein the first to third sub-channels are defined in the middle plate.

5. The apparatus of claim 4, wherein in the unit structure, the lower plate, the middle plate, and the upper plate are joined and connected to each other.

6. The apparatus of claim 4, wherein the first inlet and the first micro-channel are formed by partially etching the lower plate from a face to be etched thereof toward an opposite face thereto to partially open the face to be etched such that the opposite face to the face to be etched remains;

wherein the second inlet and the second micro-channel are formed by partially etching the upper plate from a face to be etched thereof toward an opposite face thereto to partially open the face to be etched such that the opposite face to the face to be etched remains; and wherein the first to third sub-channels are formed by partially etching the middle plate from a face to be etched thereof toward an opposite face thereto to partially open the face to be etched such that the opposite face to the face to be etched remains, wherein the open face of the lower plate is coupled to and face the face opposite to the open face of the middle plate, wherein the open face of the upper plate faces and is coupled to the open face of the middle plate.

7. The apparatus of claim 4, wherein the first inlet and the first micro-channel are formed by integrally etching the lower plate such that an opening penetrates the lower plate in a vertical direction, wherein the second inlet and the second micro-channel are formed by integrally etching the upper plate such that an opening penetrates the upper plate in a vertical direction, wherein the first to third sub-channels are formed by integrally etching the middle plate such that an opening penetrates the middle plate in a vertical direction.

8. The apparatus of claim 1, wherein in the unit-structure, a number of each of first inlets, second inlets, first micro-channels, second micro-channels, and merging volumes is x, wherein x is a natural number of 2 or larger, wherein the x merging volumes are arranged in a line within the second portion of the unit-structure, wherein the x first micro-channels communicating with the x merging volumes respectively are arranged in parallel and spaced apart from each other in one direction, wherein the x first inlets are arranged in a row in the first portion, wherein the x second micro-channels communicating with the x merging volumes respectively are arranged in parallel and spaced apart from each other in another direction crossing said one direction, wherein the x second inlets are arranged in a row in the first portion.

9. The apparatus of claim 8, wherein channel lengths of the first micro-channels are equal to each other, wherein channel lengths of the second micro-channels are equal to each other.

10. The apparatus of claim 8, wherein the unit-structure includes:

a first region of the first portion where the x first inlets are formed;

a second region of the first portion where the x second inlets are formed; and a separation groove defined between the first and second regions for separating the first region from the second region.

11. The apparatus of claim 8, wherein the particle formation mechanism comprises at least two unit-structures, wherein the two or more unit-structures are sequentially stacked.

12. The apparatus of claim 11, wherein the apparatus further comprises:

a first solution supply for supplying the continuous phase solutions at the same flow rate to the first inlets in the two or more unit-structures; and a second solution supply for supplying the dispersed phase solutions at the same flow rate to the second inlets in the two or more unit-structures.

13. The apparatus of claim 12, wherein an outlet of the first solution supply for releasing the continuous phase solution to the first inlets is constructed to communicate simultaneously with all of the first inlets, wherein an outlet of the second solution supply for releasing the dispersed phase solution to the second inlets is constructed to communicate simultaneously with all of the second inlets.

14. The apparatus of claim 1, wherein the particle formation mechanism comprises at least two unit-structures, wherein the two or more unit-structures are sequentially stacked.

15. The apparatus of claim 14, wherein the unit-structures are stacked to form a vertical stack.

16. The apparatus of claim 15, wherein the unit-structures are diffusion-bonded to one another or are brazing-boned to one another.

17. The apparatus of claim 1, wherein the apparatus further comprises:

a first solution supply in communication with the first inlet to supply the continuous phase solution thereto; and a second solution supply in communication with the second inlet to supply the dispersed phase solution thereto.

18. The apparatus of claim 1, wherein the particle-outlet micro-channel comprises an outlet pipe in communication with the merging volume.

* * * * *